(No Model.)
G. H. PORT.
COTTON SEED PLANTER.
No. 291,768. Patented Jan. 8, 1884.
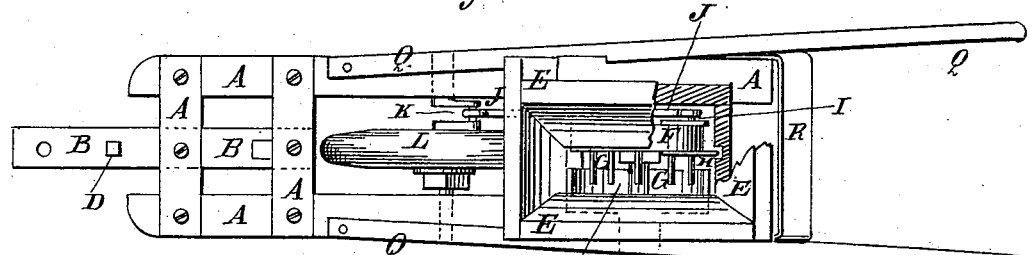
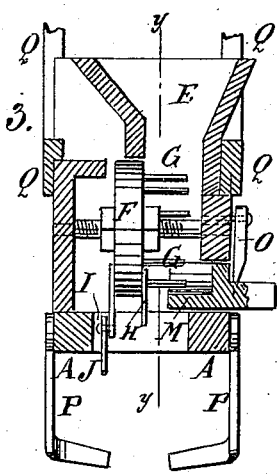
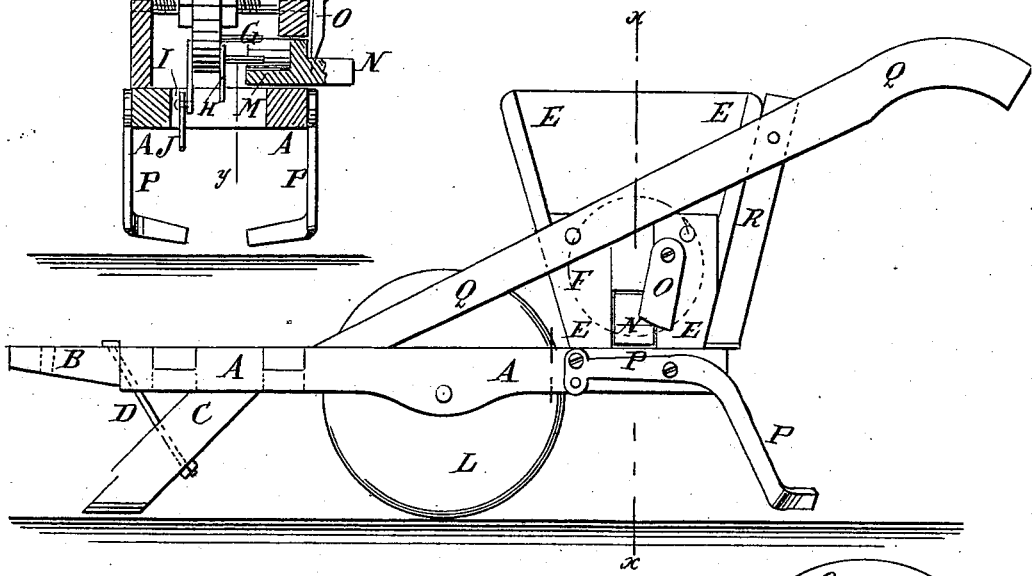
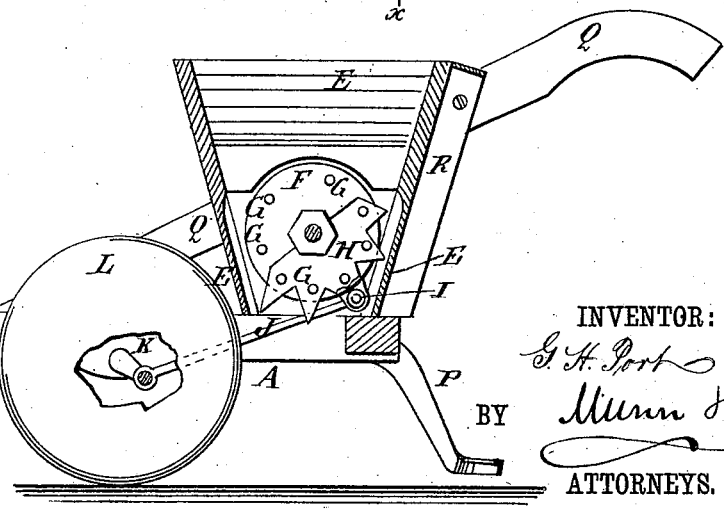
WITNESSES:
Chas. Nida
C. Sedgwick
INVENTOR:
G. H. Port
BY Munn & Co
ATTORNEYS.

UNITED STATES PATENT OFFICE.

GE HU PORT, OF SEVENTH DISTRICT, COWETA COUNTY, ASSIGNOR TO HIMSELF AND LEVI BALLARD, OF PALMETTO, GEORGIA.

COTTON-SEED PLANTER.

SPECIFICATION forming part of Letters Patent No. 291,762, dated January 8, 1884.

Application filed August 16, 1883. (No model.)

*To all whom it may concern:*

Be it known that I, GE HU PORT, of Seventh District, in the county of Coweta and State of Georgia, have invented a new and useful Improvement in Cotton-Seed Planters and Fertilizer-Distributers, of which the following is a full, clear, and exact description.

Reference is to be had to the accompanying drawings, forming a part of this specification, in which similar letters of reference indicate corresponding parts in all the figures.

Figure 1 is a plan view of my improvement, part being broken away. Fig. 2 is a side elevation of the same. Fig. 3 is a sectional front elevation of the same, taken through the line x x, Fig. 2. Fig. 4 is a sectional side elevation of the same.

My invention relates to improvements in cotton-seed planters and fertilizer-distributers; and it consists in the peculiar construction and arrangement of the parts, as hereinafter more fully set forth, and pointed out in the claim.

A represents the frame of the machine, to the forward part of which are attached the draw-bar B and the standard C for the furrow-opening plow. The standard C is strengthened against the draft-strain by a brace-bar, D, attached to it and to the draw-bar B.

To the rear part of the frame A is attached the seed-box E, which is made deep and narrow, and with a recess in one side of the lower part to receive the feed-wheel F, so that the inner side of the said wheel will form the side of the lower part of the said seed-box.

To the inner side of the feed-wheel F are attached pins G, projecting horizontally nearly to the other side of the seed-box, and which are closer together at the lower part of the said wheel than at its upper part.

To the inner side of the lower part of the wheel F is attached a plate, H, having teeth in its outer edge which projects beyond the rim of the said wheel, as shown in Figs. 3 and 4. The toothed plate H is especially designed for use in distributing guano and other fine fertilizers. The journals of the wheel F revolve in bearings in the sides of the seed-box E, and to a crank-pin, I, attached to the outer side of the said wheel F, or to an arm attached to the said outer side, is pivoted the rear end of a connecting-rod, J, the forward end of which is pivoted to a crank, K, formed upon a journal of the wheel, L, at the inner side of a side bar of the frame A. The journals of the wheel L revolve in bearings attached to the side bars of the frame A, and the rim of the said wheel is rounded, as shown in Fig. 1, to cause it to pack the sides of the furrow, and thus keep it open until the seed and fertilizer have been deposited in it. The crank K is made short, so that the revolution of the drive-wheel L will only rock the feed-wheel F. The bottom M of the feed-box E is loose, concaved upon its upper side, rests upon the frame A, and is made of such a thickness that its upper surface will be a little above the edge of the feed-wheel F.

Upon the outer edge of the sliding bottom M is formed an arm, N, which projects through an opening in the side of the seed-box E, and serves as a handle for adjusting the said bottom M to form a larger or smaller discharge-opening, accordingly as more or less cotton-seed and fertilizer are to be distributed. The bottom M is secured in place when adjusted by a button, O, pivoted to the side of the seed-box E in such a position that its rounded end can be turned against the arm N, as shown in Fig. 2.

To the rear parts of the side bars of the frame A are attached the forward parts of the bars P, which, at the rear ends of the said side bars, are bent downward, and their ends are bent inward, as shown in Figs. 2, 3, and 4, to serve as coverers to cover the seed and fertilizer.

Q are the handles, the forward ends of which are attached to the side bars of the frame A. The handles Q are attached to the standards or arched bar R, the ends of which are attached to the rear ends of the side bars of the frame A, so that the said handles will be firmly supported in place. The handles Q are also attached to the sides of the seed-box E, to strengthen the said seed-box in position.

By detaching the coverers P and using a longer standard, C, the machine can be used for depositing a fertilizer in a deep furrow, so that the seed can be placed above and out of contact with the said fertilizer.

Having thus fully described my invention, I claim as new and desire to secure by Letters Patent—

In a seed-planter and fertilizer-distributer, the combination, with the frame A and seed-box E, provided with a circular opening in one side to receive the feed-wheel, and having an adjustable concaved bottom, M, of the feed-wheel F, fitting in the opening in the seed-box and provided with horizontal pins G and serrated wheel H, drive-wheel L, having an axle provided with a crank, K, connecting-rod J, and crank I, substantially as and for the purpose set forth.

GE HU PORT.

Witnesses:
J. F. ELLINGTON,
D. P. HEARN.